Patented Mar. 7, 1944

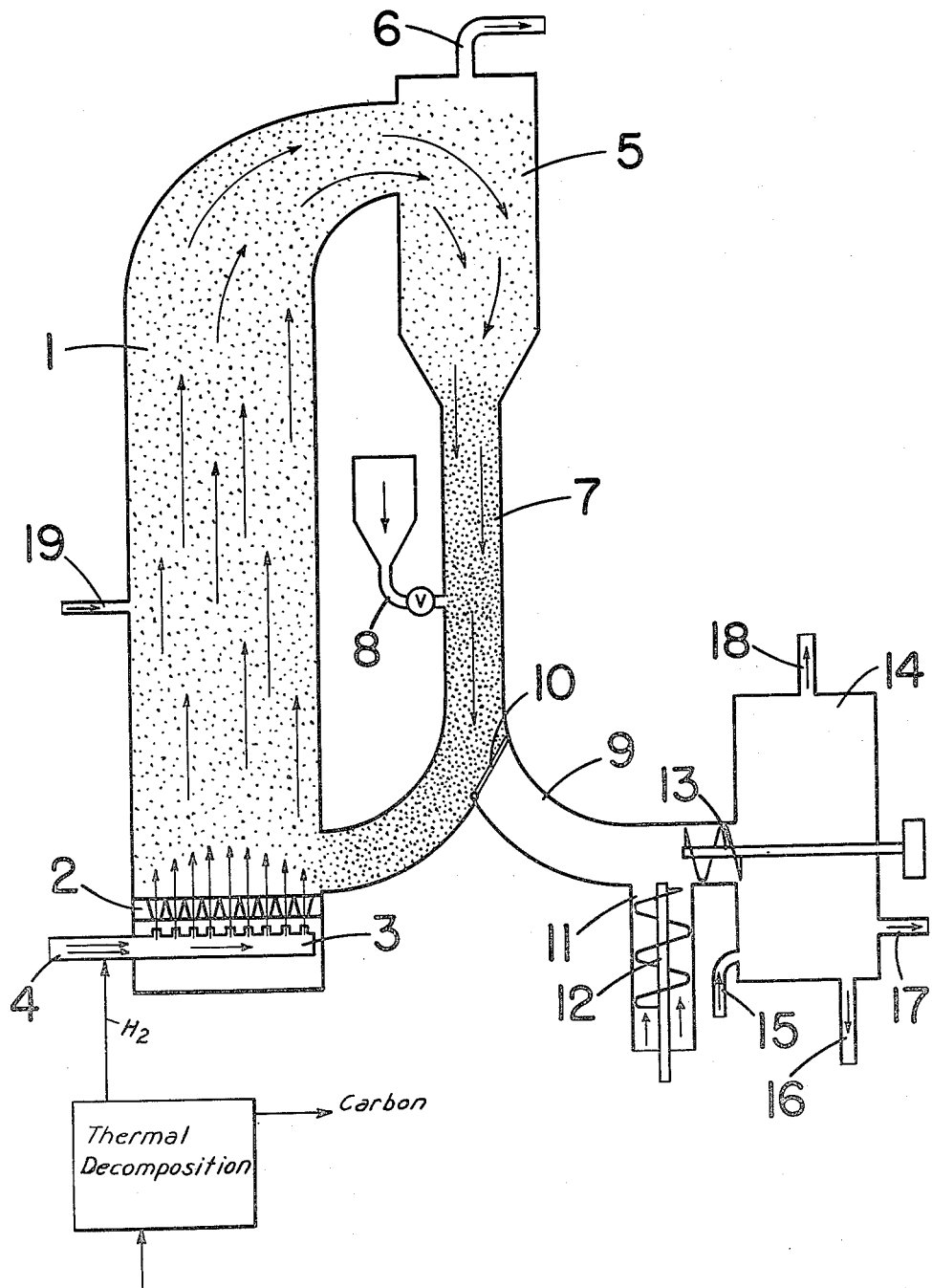

2,343,780

UNITED STATES PATENT OFFICE 2,343,780

REACTION BETWEEN SOLIDS AND GASES

Warren K. Lewis, Cambridge, Mass., assignor to Standard Oil Development Company, a corporation of Delaware Application August 1, 1941, Serial No. 405,033

10 Claims. (Cl. 75—26)

The present invention is directed to chemical reactions between solids and gases and particularly to the recovery of metals from their ores, such as iron from iron ore, nickel from nickel ore, etc.

In the past efforts have been made to utilize natural gas for the recovery of iron from iron ore. Many attempts have met with failure because the procedure adopted was to utilize the natural gas directly as a source of heat and as a reducing agent. Natural gas is an inefficient reducing agent and the result of the aforesaid attempts has been the conclusion that natural gas offers little promise as a substitute for solid fuel in the smelting of iron ore.

According to the present invention natural gas is utilized in the smelting of iron ore by first subjecting it to a treatment capable of converting it into a gas rich in free hydrogen and then utilizing this gas in a unique manner for the reduction of iron ore. This latter step is accomplished according to the present invention by suspending powdered iron ore in a stream of the gas in such a way that the mixture presents the appearance of a boiling liquid and the powdered iron ore and resulting powdered iron is carried along slowly in the gas stream. This has been achieved by regulation of the gas velocity. To put it another way, a substantially uniform dispersion of powdered iron and iron ore is carried along in a stream of the gas at a rate lower than the velocity of the gas stream. In order that this may be achieved this reduction step is conducted at a temperature below the plastic temperature of metallic iron. A suitable temperature is in the neighborhood of 700° C., the minimum temperature being dictated by that necessary to support the reaction between hydrogen and iron oxide.

In practice, it is preferred to subject the natural gas to pyrolysis to convert it into carbon and hydrogen because in this case the carbon produced is thermatomic carbon, which lends itself readily to introduction into a flowing stream of the powdered iron for carburization of the latter. If desired, however, the natural gas may be reacted with steam in the presence of a catalyst under conditions favorable to the production of hydrogen and carbon monoxide, and the gas mixture so produced may be used as such since both components are effective reducing agents.

The nature of the present invention will be more readily apparent from the following detailed description of the accompanying drawing in which the single figure is a front elevation in diagrammatic form of an apparatus suitable for the practice of the present invention.

Referring to the drawing in detail, numeral 1 designates a tower at the bottom of which is arranged a grate 2 beneath which is a manifold 3 connected with a pipe line 4 for the introduction of reducing and heating gas. The upper end of chamber 1 is preferably curved to an outlet which discharges into a separator 5 at the upper end of which is a gas outlet 6. The lower end of the separator 5 is connected with a second tower 7 which is of smaller diameter than tower 1. At an intermediate point in this tower is arranged an inlet 8 for finely divided iron ore. It will be understood that this inlet will in practice take the form of a hopper adapted to discharge powdered ore intermittently into the tower and at other times will be separated in a gas-tight manner from the tower. The lower end of tower 7 is also preferably curved somewhat in the manner shown so as to connect with the lower end of tower 1. A branch passage 9 is connected to the lower end of tower 7 and at the bottom of the intersection of the two there is arranged a flap 10, pivoted as shown, and adapted to deflect the stream of powdered iron ore either into the bottom of tower 1 or into the line 9.

In operation the powdered ore is charged into tower 7 through line 8 and a stream of gas is started in from the manifold 3. The charging of the ore is continued while the gas stream is flowing until both tower 1 and tower 7 are filled with a fairly dense suspension of powdered iron ore in gas. The gas velocity is so regulated as to prevent settling just above the grate and keep the stream of iron ore moving at a slow rate. The ore from tower 7 feeds continuously into tower 1 because it is a much denser suspension of iron ore, most of the gas having been taken off at the top of separator 5. It will be understood that separator 5 is substantially completely filled with the iron ore suspension, so that the whole circulating system is in effect a circulating stream of iron ore.

The gas admitted, as previously indicated, is of a reducing nature and is preferably hydrogen. Sufficient air is admitted with the hydrogen to produce by combustion of the latter sufficient heat to maintain the desired temperature which will be in the neighborhood of 700° C., and in any event below that temperature at which iron assumes a plastic state. When the iron ore is circulated through the system for a sufficient period of time to become completely reduced, the flap 10 is moved so as to deflect the particles of iron into the discharge line 9.

The powdered product can be withdrawn through line 9 for any use desired. Where the oxide used is of high purity, the resulting iron powder will be correspondingly pure and may be used directly for many purposes without melting. The drawing also illustrates diagrammatically means for melting this powder, to be used as desired.

Line 9 is provided with a branch line 11 in which is a worm conveyor 12. Through this branch line carbon is introduced into the stream of reduced iron. This carbon, according to the present invention, is the thermatomic carbon resulting from the pyrolysis of a hydrocarbon gas, such as methane, used to produce the hydrogen used in the first stage. Also at this point slag forming materials may be introduced if desired or if the iron contains ingredients which require their use.

Just behind the junction of branch line 11, a worm conveyor 13 is arranged in line 9 which forces the iron and carbon, together with any slag forming constituents, into a vessel 14 where the mixture is heated up by the combustion of gas introduced through line 15 to a temperature between 1100° and 1600° C. The worm discharge end 13 is preferably shielded from the radiant heat of the melting zone and cooled by any suitable means to avoid heating the iron powder to the plastic stage before it is discharged from the worm. It is to be noted that the gas used is a hydrocarbon gas mixed with sufficient air or oxygen to give the desired temperature but insufficient to change the predominantly reducing nature of the gas.

In vessel 14 the iron and carbon combine to form a low melting alloy (pig iron) which settles to the bottom and may be drawn off through a line 16. A slag draw off line 17 is also provided and at the top of vessel 14 is an exhaust vent 18 for gas.

It is to be understood that the carburizing step may be omitted, if desired. Moreover, if carburizing is desired the carbon can be introduced even with the iron ore or with the reducing gas because the temperature in the reduction zone is maintained below the melting point of iron-carbon alloy. It is contemplated, according to the present invention, that the carbon resulting from pyrolysis of methane, for example, will be carried along with the hydrogen into the reduction zone and there mixed with the reduced iron as it is formed. This procedure may be followed without any substantial loss of control over the iron-carbon ratio by continuously sampling the incoming reducing gas, determining its carbon content and controlling said content by using a carbon separator between the pyrolysis zone and the reduction zone. The procedure illustrated in the drawing, however, permits easier control.

In the above description, it has been stated that sufficient air is introduced with hydrogen into manifold 3 to maintain the desired temperature by combustion of the hydrogen. One of the advantages of the present invention is that the hydrogen, when recovered from the pyrolysis of methane, for example, is at a temperature above 1000° C., whereby the use of additional air may be largely or even completely avoided. In some cases it is more desirable to add the air at a point removed from the inlet port for the hydrogen, such as through inlet port 19.

The foregoing description of the drawing is intended merely as an illustration of one embodiment of the present invention, other embodiments of which will be apparent to those skilled in the art. For example, the invention is not limited to the treatment of iron ore, but is applicable to the recovery of metal from any reducible compound thereof. The principle of operation according to which a closed cycle of moving powdered material to be treated is established and the treating fluid, ordinarily gas, is used as the motivating power for the movement of material around the cycle has general application. It is particularly applicable to any reaction between a solid and a gas.

The nature and objects of the present invention having been thus described and illustrated, what is claimed as new and useful and is desired to be secured by Letters Patent is:

1. In the production of a metal from a finely divided reducible compound thereof, the steps of suspending said compound in a vertically rising stream of a reducing gas confined within a zone maintained at a reduction temperature below that at which the metal becomes plastic, maintaining a sufficient vertical gas velocity to prevent settling at the bottom of said zone and to cause the compound to move slowly upwardly throughout substantially the entire cross section of said zone with said stream but at lower velocity, in a dispersion having characteristics of a boiling liquid with respect to mass continuity and surface disturbance, and discharging the compound reduced at least in part from an upper part of said zone.

2. Method according to claim 1, in which finely divided iron ore is reduced.

3. In the production of iron from iron ore, the steps of establishing an upwardly moving stream of reducing gas in a confined space, maintaining in said space a temperature below that at which iron becomes plastic, feeding into the bottom of said space iron ore in sufficiently finely divided form to be capable of being carried along by said stream of gas, removing the finely divided material from the gas at the upper end of said space, and recycling said finely divided material through a path separated from said space to the lower end of said space.

4. In the production of iron from iron ore, the steps of establishing a closed cycle including two substantially vertically arranged passages connected to each other at their ends, introducing finely divided iron ore into said cycle, moving said iron ore upwardly through one of said passages by suspending it in an upwardly moving stream of reducing gas moving at a sufficient velocity to carry said iron ore, maintaining at least a portion of said stream at a reducing temperature below that at which iron becomes plastic, separating said gas from said iron ore at the upper end of said passage, and causing said iron ore to move downwardly through the other passage by gravity and thence back to the first passage.

5. In the production of iron from iron ore, the steps of circulating a finely divided iron ore in a closed cycle including a zone maintained at a reducing temperature below that at which iron becomes plastic, separately decomposing a hydrocarbon gas into thermatomic carbon and hydrogen, introducing the hydrogen while still at least at the temperature of the hydrocarbon decomposition into said reducing zone, continuing the circulation of the iron ore in said cycle until it is substantially reduced, discharging the reduced ore from said cycle, mixing it with the thermatomic carbon in proportions suitable for the formation of a low-melting iron-carbon alloy, subjecting the mixture to a temperature at which said alloy is molten, and removing the molten alloy from the system.

6. In the production of a metal from a metal compound thereof which is reducible at a temperature below the melting point of the metal, the steps of establishing a closed cycle through which said metal compound in finely divided form is circulated, said cycle including a vertical reduction zone, maintaining said reduction zone at a temperature suitable for the reduction of the metal compound below the melting point of the metal, introducing a reducing gas into said cycle below said zone, causing said gas to rise upwardly through said zone at a rate sufficient to cause the metal compound to move upwardly therethrough in a substantially uniform dispersion in the stream of gas and removing gas and the compound reduced at least in part from said cycle above said zone.

7. In the production of a metal from a metal compound thereof which is reducible below the melting point of the metal, the steps of establishing a closed cycle including two substantially vertically arranged passages connected to each other at their ends, introducing said metal compound in finely divided form into said cycle, moving said metal compound upwardly through one of said passages by suspending it in a stream of reducing gas moving upwardly at a sufficient velocity to carry said metal compound, maintaining at least a portion of said stream at a reducing temperature below that at which the metal melts, separating said gas from the finely divided solid at the upper end of said passage, and causing said finely divided solid to move downwardly through the other passage by gravity and thence back to the first passage.

8. An apparatus suitable for a chemical reaction between a gas and a finely divided solid, comprising a pair of substantially upright towers interconnected at both their ends to provide a closed cycle through which said finely divided solid is circulated, one of said towers being of substantially larger cross-sectional area than the other, means for introducing gas at the lower end of said tower of larger cross-section, an outlet for gas at the upper end of said towers, means for introducing finely divided sold to be reacted into the cycle comprising said towers, and means for removing reacted finely divided solid from said cycle.

9. In the production of a metal from a solid compound thereof which is reducible to the metal at a temperature below its melting point, the steps of providing a vertically arranged passage, supplying said metal compound in finely divided solid form to the lower portion of said passage, supplying a reducing gas to the bottom of said passage and causing it to pass upwardly through said passage at a sufficient velocity to prevent settling at the bottom of said zone and to cause the solid material to move slowly upwardly in a substantially uniform dispersion in the rising stream of gas, maintaining said passage at a reducing temperature below that at which said metal melts, withdrawing a suspension of reduced metal particles in gas from the upper portion of said passage and separating said reduced metal from the suspending gas.

10. In the production of iron from an ore thereof which is reducible to the metal at a temperature below the melting point thereof, the steps of providing a vertically arranged passage, supplying said iron ore in finely divided form to the lower portion of said passage, supplying a reducing gas to the bottom of said passage and causing it to pass upwardly through said passage at a sufficient velocity to prevent settling at the bottom of said zone and to cause the ore to move slowly upwardly in a substantially uniform dispersion in the stream of gas, said dispersion having characteristics of a boiling liquid with respect to mass continuity and surface disturbance, maintaining said passage at a reducing temperature below the melting point of iron, withdrawing a suspension of reduced iron particles in gas from the upper portion of said passage and separating said reduced iron from the suspending gas.

WARREN K. LEWIS.